US012610228B2

(12) United States Patent
Dreiling et al.

(10) Patent No.: US 12,610,228 B2
(45) Date of Patent: Apr. 21, 2026

(54) REDUCING NETWORK TRAFFIC FOR UE CAPABILITY MESSAGE

(71) Applicant: T-Mobile USA, Inc., Bellevue, WA (US)

(72) Inventors: Ryan Patrick Dreiling, Shawnee, KS (US); Christopher Bailey, Overland Park, KS (US)

(73) Assignee: T-Mobile USA, Inc., Bellevue, WA (US)

( * ) Notice: Subject to any disclaimer, the term of this patent is extended or adjusted under 35 U.S.C. 154(b) by 727 days.

(21) Appl. No.: 18/160,821

(22) Filed: Jan. 27, 2023

(65) Prior Publication Data

US 2024/0259787 A1    Aug. 1, 2024

(51) Int. Cl.
*H04W 4/40*          (2018.01)
*H04W 8/24*          (2009.01)

(52) U.S. Cl.
CPC ..................................... *H04W 8/24* (2013.01)

(58) Field of Classification Search
CPC .................................. H04W 8/24; H04W 8/22
USPC ......................................................... 455/421.1
See application file for complete search history.

(56) References Cited

U.S. PATENT DOCUMENTS

2018/0234916 A1*   8/2018   Song ..................... H04W 48/18
2021/0321249 A1*  10/2021   He ......................... H04W 76/11
2025/0324357 A1*  10/2025   Long ..................... H04W 60/00

* cited by examiner

*Primary Examiner* — Tanmay K Shah
(74) *Attorney, Agent, or Firm* — Lee & Hayes, P.C.

(57)                    ABSTRACT

A carrier network may provide UE capability message handling with reduced network traffic using a UE capability repository. For example, a Mobility Management Entity (MME) may receive, from a user equipment (UE), a token associated with UE capability information of the UE, transmit, to a UE capability repository, a request for UE capability information of the UE based at least in part on the token, receive, from the UE capability repository, the UE capability information of the UE associated with the token, and perform operations with the UE based on the UE capability information of the UE associated with the token.

20 Claims, 7 Drawing Sheets

100

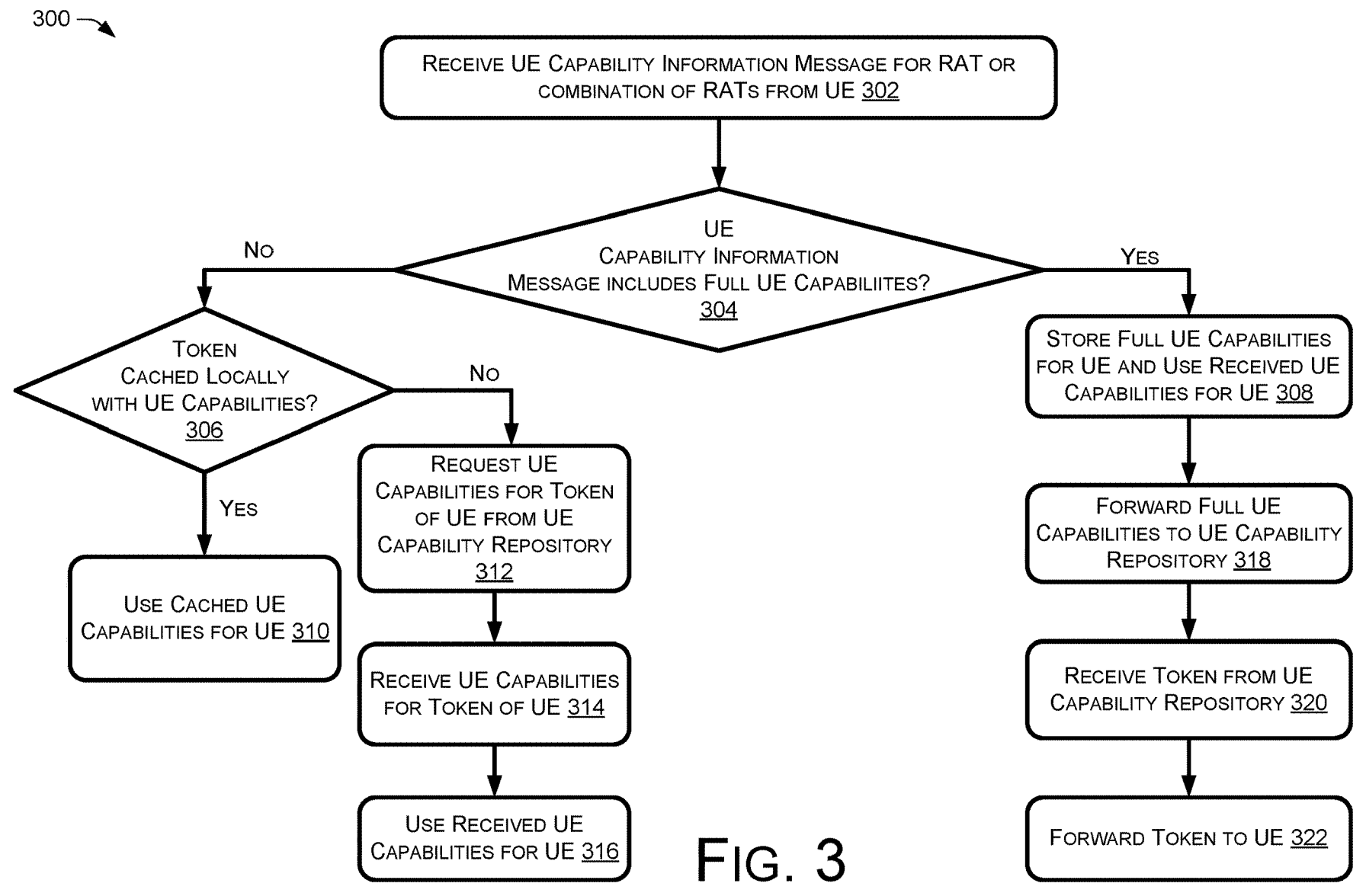

300 —

RECEIVE UE CAPABILITY INFORMATION MESSAGE FOR RAT OR COMBINATION OF RATs FROM UE 302

UE CAPABILITY INFORMATION MESSAGE INCLUDES FULL UE CAPABILIITES? 304

YES

STORE FULL UE CAPABILITIES FOR UE AND USE RECEIVED UE CAPABILITIES FOR UE 308

FORWARD FULL UE CAPABILITIES TO UE CAPABILITY REPOSITORY 318

RECEIVE TOKEN FROM UE CAPABILITY REPOSITORY 320

FORWARD TOKEN TO UE 322

NO

TOKEN CACHED LOCALLY WITH UE CAPABILITIES? 306

NO

REQUEST UE CAPABILITIES FOR TOKEN OF UE FROM UE CAPABILITY REPOSITORY 312

RECEIVE UE CAPABILITIES FOR TOKEN OF UE 314

USE RECEIVED UE CAPABILITIES FOR UE 316

YES

USE CACHED UE CAPABILITIES FOR UE 310

FIG. 3

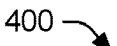
400
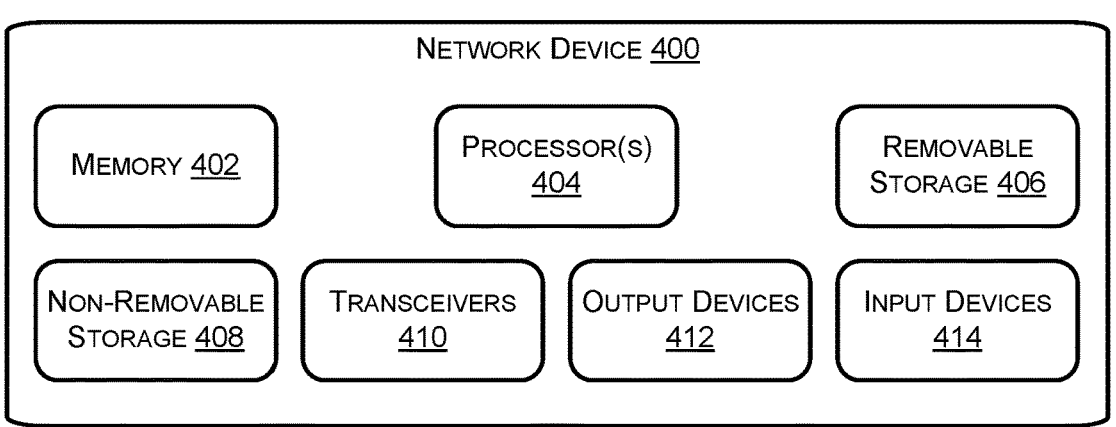
FIG. 4

REDUCING NETWORK TRAFFIC FOR UE CAPABILITY MESSAGE

BACKGROUND

In recent years, mobile devices have advanced from offering simple voice calling services within wireless communication networks to providing many new capabilities, features, and RF bands. With this growth, the amount of data for user equipment (UE) capability messaging also grows and may become burdensome.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 3 illustrates an example method for providing UE capability message handling with reduced network traffic using a UE capability repository, according to some implementations.

FIG. 4 is a block diagram illustrating relevant high-level components of a device that may be used to implement various of the components described herein.

DETAILED DESCRIPTION

Figure 1A:
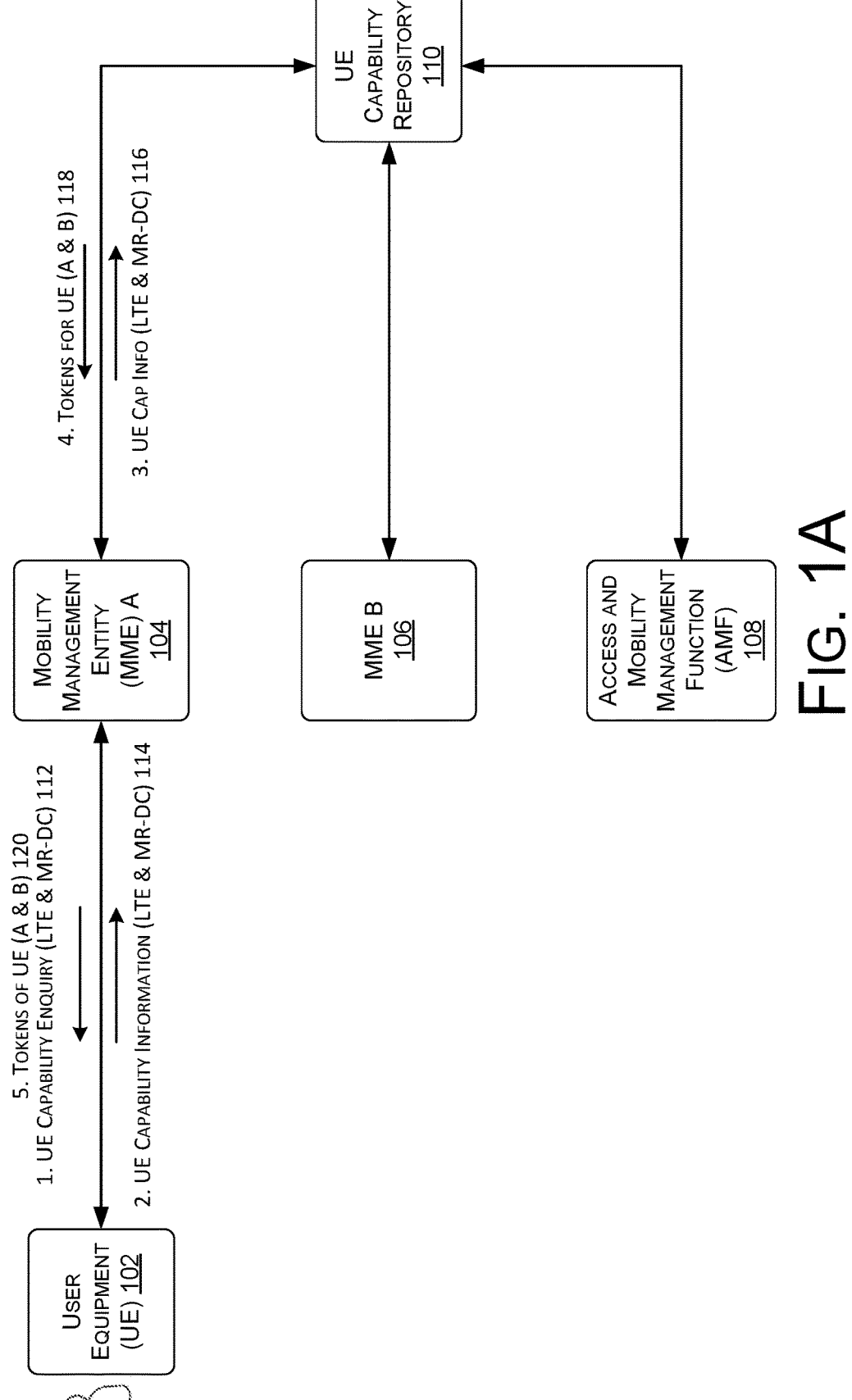
FIGS. 1A-1D illustrate an example telecommunication system, which may include a UE capability repository and may provide for reduced network traffic for UE capability messaging, according to some implementations.

The described implementations include devices, systems, and methods that may reduce network traffic for user equipment (UE) capability messaging. For example, systems according to this disclosure may include a UE capability repository that may store an association between a set of UE capabilities of a UE with a corresponding identifier.

In some examples, a network may request the capabilities of a UE attaching to the network through a UE capability enquiry message. In a UE capability enquiry message, the network may specify the radio access technology (RAT) (e.g., 4G, 5G NSA, 5G SA) for which the network is requesting UE capability information. In response, the UE may generate a UE capability information message for the requested RAT and send the generated UE capability information message to the network (e.g., to a Mobility Management Entity (MME) or an Access and Mobility Management Function (AMF)). In some examples, after the network receives a UE capability information message from a UE, a UE capability repository may store the UE capability information for the UE and the requested RAT in association with a corresponding identifier. In some examples, the identifier may be associated with the current capabilities of the UE for the requested RAT. The network may send the identifier to the UE (e.g., via the MME or AMF). In some examples, the MME or AMF may store an association of the identifier with the UE capability information (e.g., in a cache).

Subsequently, when the UE is to send a UE capability information message for the RAT to the network, the UE may send the identifier instead of the full UE capability information for the requested RAT. For example, the network may request UE capability information when the UE crosses into a new tracking area, crosses a MME or AMF boundary or transitions between RATs (e.g., between 4G, 5G NSA, and/or 5G SA). The MME or AMF receiving the identifier from the UE may request the UE capability information from the UE capability repository based on the identifier. In addition or alternatively, if the MME or AMF receiving the identifier from the UE includes a local store of associations between identifiers and UE capability information (e.g., a cache), the MME or AMF may determine if the local store includes an entry for the identifier. If so, the MME or AMF may utilize the UE capability information associated with the identifier in the local store.

When the UE capabilities change for a given UE (e.g., for example, VONR is locally disabled on the device), the UE can send an updated UE capability information message along with the identifier for the old UE capability information. The network, upon receiving the updated UE capability information message along with the identifier for the old UE capability information, may forward the updated UE capability information message along with the identifier for the old UE capability information to the UE capability repository. The UE capability repository may remove the entry for the identifier for the old UE capability information and store the updated UE capability information in association with a corresponding new identifier. The network may then send the new identifier to the UE (e.g., via the MME or AMF). If the MME or AMF includes a local store of associations between identifiers and UE capability information, the MME or AMF may also store an association of the new identifier with the updated UE capability information and remove the old association for the old identifier.

By utilizing a UE capability repository storing associations of identifiers to the current capabilities of UEs, the overhead and complexity of UE capability messaging may be reduced. Such reduced overhead and complexity may reduce the complexity, cost and effort in establishing and operating the network.

While particular RAT(s) or combinations of RATs (e.g., LTE, MR-DC, Non-Standalone (NSA), 5G Standalone (SA), etc.) may be utilized in the discussions of example embodiments throughout this disclosure, this disclosure and the appended claims are not so limited. For example, other embodiments may utilize other RATS, networks, protocols, and standards to accomplish similar functions. For example, the discussion herein relates to UE capability information messages and UE capability enquiry messages which may be or be similar to "UE Capability Information Messages" and "UE Capability Enquiry Messages" according to one or more 3GPP standards. However, other standards or nonstandard messages may be utilized to accomplish similar functions.

FIGS. 1A-1D illustrate an example telecommunication system 100, which may include a UE capability repository and may provide for reduced network traffic for UE capability messaging, according to some implementations. The system 100 includes user equipment (UE) 102, a Mobility Management Entity (MME) A 104, a MME B 106, an Access and Mobility Management Function (AMF) 108 and a UE capability repository 110.

In some examples, MME A 104, MME B 106, AMF 108 and the UE capability repository 110 may be components of a carrier network providing service to the UE 102 via multiple radio access technologies (e.g., 4G, NSA, and/or SA).

In some examples, the MME A 104, the MME B 106, and the AMF 108 may be configured to find, route, maintain, and transfer communications. For example, the MME A 104, the MME B 106, and the AMF 108 may be configured to perform end-to-end connection signaling and security services between core networks, and to maintain connection information about UEs, and determine which gateway is to be used to connect a UE to another network. Further, in some examples herein, the MME A 104, the MME B 106, and the AMF 108 may be configured to handle UE capability messaging with UEs (e.g., UE 102).

The MME A 104, the MME B 106, and the AMF 108 may communicate with the UE 102 via one or more base stations (e.g., eNodeB, gNodeB, etc.) which are not shown for ease of illustration and explanation. Some operations discussed herein with respect to the MME A 104, the MME B 106, and the AMF 108, such as transmitting a UE capability enquiry to the UE 102, may be performed by a base station associated with the MME A 104, the MME B 106, or the AMF 108.

The MME A 104, the MME B 106, or the AMF 108 may be configured to receive a UE capability information message from UE 102 for a RAT. If the UE capability information message includes UE capability information for the RAT, the MME A 104, the MME B 106, or the AMF 108 may be configured to forward the UE capability information message to the UE capability repository 110.

The UE capability repository 110 may be configured to receive UE capability information for UE 102 from an MME or AMF. The UE capability repository 110 may generate an identifier corresponding to the UE capability information for the RAT and store an association between the identifier and the corresponding UE capability information for the RAT. Herein, identifiers corresponding UE capability information may be referred to as tokens. The UE capability repository 110 may return the token to the MME or AMF.

The MME A 104, the MME B 106, or the AMF 108 may be configured to receive the token from the UE capability repository 110. The MME A 104, the MME B 106, or the AMF 108 may send the token to the UE 102. In some examples, the MME or AMF may store an association of the token with the UE capability information for the RAT (e.g., in a cache).

Subsequently, when the UE 102 sends a UE capability information message for the RAT to the network, the UE 102 may send the token instead of the UE capability information for the requested RAT. For example, the UE 102 may send UE capability information messages to the network when the UE crosses into a new tracking area, crosses a MME or AMF boundary, or transitions between RATs (e.g., between 4G, 5G NSA, and/or 5G SA).

The MME A 104, the MME B 106, or the AMF 108 may be configured to receive the token from the UE 102. The MME A 104, the MME B 106, or the AMF 108 may be configured to request UE capability information for the RAT from the UE capability repository 110 based on the token. In addition or alternatively, if the MME A 104, the MME B 106, or the AMF 108 receiving the token from the UE 102 includes a local store of associations between tokens and UE capability information (e.g., a cache), the MME A 104, the MME B 106, or the AMF 108 may be configured to determine if the local store includes an entry for the token. If so, the MME A 104, the MME B 106, or the AMF 108 may be configured to utilize the UE capability information for the RAT associated with the token in the local store.

The UE capability repository 110 may further be configured to receive, from a MME or AMF, a request for UE capability information including a token. The UE capability repository 110 may retrieve the UE capability information corresponding to the received token. The UE capability repository 110 may then return the UE capability information corresponding to the received token to the requesting MME or AMF.

When the UE capabilities change for a given UE (e.g., for example, VONR is locally disabled on the device), the UE may be configured to send an updated UE capability information message along with the token for the old UE capability information.

The MME A 104, the MME B 106, or the AMF 108 may be configured to receive the updated UE capability information message along with the token for the old UE capability information. The MME A 104, the MME B 106, or the AMF 108 may be configured to forward the updated UE capability information message along with the token for the old UE capability information to the UE capability repository 110. If the MME A 104, the MME B 106, or the AMF 108 includes a local store of associations between tokens and UE capability information, the MME A 104, the MME B 106, or the AMF 108 may also remove the association for the token for the old UE capability information.

The UE capability repository 110 may further be configured to receive, from a MME or AMF, updated UE capability information for a UE. In some examples, the updated UE capability information may be received with a token corresponding to a previous version of the UE capability information. For example, tokens may be generated for current UE capabilities for a corresponding RAT. In such an example, when the UE capabilities of the corresponding RAT are updated (e.g., a local change at the UE), the UE capability repository 110 may replace the association for the existing token with an association between a new updated token with the updated UE capabilities for the corresponding RAT.

The MME A 104, the MME B 106, or the AMF 108 may be configured to receive the updated token from the UE capability repository 110. The MME A 104, the MME B 106, or the AMF 108 may then send the updated token to the UE 102. If the MME A 104, the MME B 106, or the AMF 108 includes a local store of associations between tokens and UE capability information, the MME A 104, the MME B 106, or the AMF 108 may store an association of the updated token with the updated UE capability information (e.g., replacing the existing association, if the existing association has not already been removed).

As mentioned above, in examples discussed herein, tokens may be generated for current UE capabilities for a corresponding RAT. However, examples are not so limited. For example, a tokens may be generated per UE (e.g., a token may be associated with capability information for all RATs of the UE or network), may be generated for individual RATs or combinations of RATs, may be generated for individual RATs or combinations of RATs and RF bands, may be reused when capabilities are updated, or a combination of these and/or other variations which would be apparent to one of ordinary skill in the art in view of this disclosure.

The UE 102 may comprise a communication device configured to communicate over a wireless and/or wireline network. UE 102 may also comprise a non-mobile computing device, including, without limitation such things as televisions, desktop computers, a game consoles, set top boxes, home automation components, security system components, and so forth. While examples discussed herein relate to UEs that are IoT devices, implementations are not so limited. For example, mobile computing devices may include, without limitation, a mobile phone (e.g., a smart phone), a tablet computer, a laptop computer, a portable digital assistant (PDA), a wearable computer (e.g., electronic/smart glasses, smart watches, fitness trackers, etc.), a networked digital camera, etc. In this sense, the terms "communication device," "wireless device," "wireline device," "mobile device," "computing device," and "user equipment (UE)" may be used interchangeably herein to describe any communication device capable of performing the techniques described herein.

Furthermore, UE 102, as well as the various network provider components described herein, may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VOIP), Voice over LTE (VOLTE), IEEE 802.1x protocols, WiMAX, Wi-Fi, and/or any future network technology or evolution of an existing network technology (e.g., IP or Non-IP based). These are merely examples and UE 102, as well as the various network provider components described herein, may be capable of communicating via one or more of a 3G, 4G, 4G LTE, and/or 5G protocols.

The UE 102 may communicate with the MME A 104 using an access network (not shown), which may comprise a cellular communication network or other type of wired or wireless network. Examples of wireless access networks include LTE, WIFI, GSM EDGE Radio Access Network (GERAN), UMTS Terrestrial Radio Access Network (UTRAN), and other cellular access networks.

In the operations illustrated in FIG. 1A-FIG. 1D, the UE 102, the MME A 104, the MME B 106, the AMF 108, and UE capability repository 110 may operate to perform UE capability message handling with reduced network traffic and complexity.

The illustrated operations in FIG. 1A may follow an initial connection by the UE 102 to the network associated with the MME A 104, the MME B 106, and the AMF 108. Specifically, the UE 102 may enter a service area of an eNodeB of the MME A 104. An attachment operation may be performed during which, the MME A 104 may send a UE capability enquiry message 112 to the UE 102 for two RATs, specifically LTE and MR-DC.

The UE 102 may receive the UE capability enquiry message 112. Because UE 102 has not been provided with tokens associated with LTE or MRDC, the UE 102 may send a UE capability information message 114 for LTE and MR-DC to the MME A 104.

The MME A 104 may receive the UE capability information message 114 from the UE 102. Because the UE capability information message 114 includes UE capability information, the MME A 104 may send a message 116 including the UE capability information for LTE and MR-DC to the UE capability repository 110.

The UE capability repository 110 may receive the message 116 from the MME A 104. The UE capability repository 110 may generate a token A for LTE and a token B for MR-DC. The UE capability repository 110 may then store associations between the token A and the UE capability information for LTE and between token B and the UE capability information for MR-DC. The UE capability repository 110 may then send a message 118 to the MME A 104 for the UE including token A and token B.

The MME A 104 may receive the message 118 from the UE capability repository 110. If the MME A 104, the MME B 106, or the AMF 108 includes a local store of associations between tokens and UE capability information, the MME A 104 may store associations between the token A and the UE capability information for LTE and between token B and the UE capability information for MR-DC. The MME A 104 may further send a message 120 to the UE 102 including token A and token B.

Figure 1B:
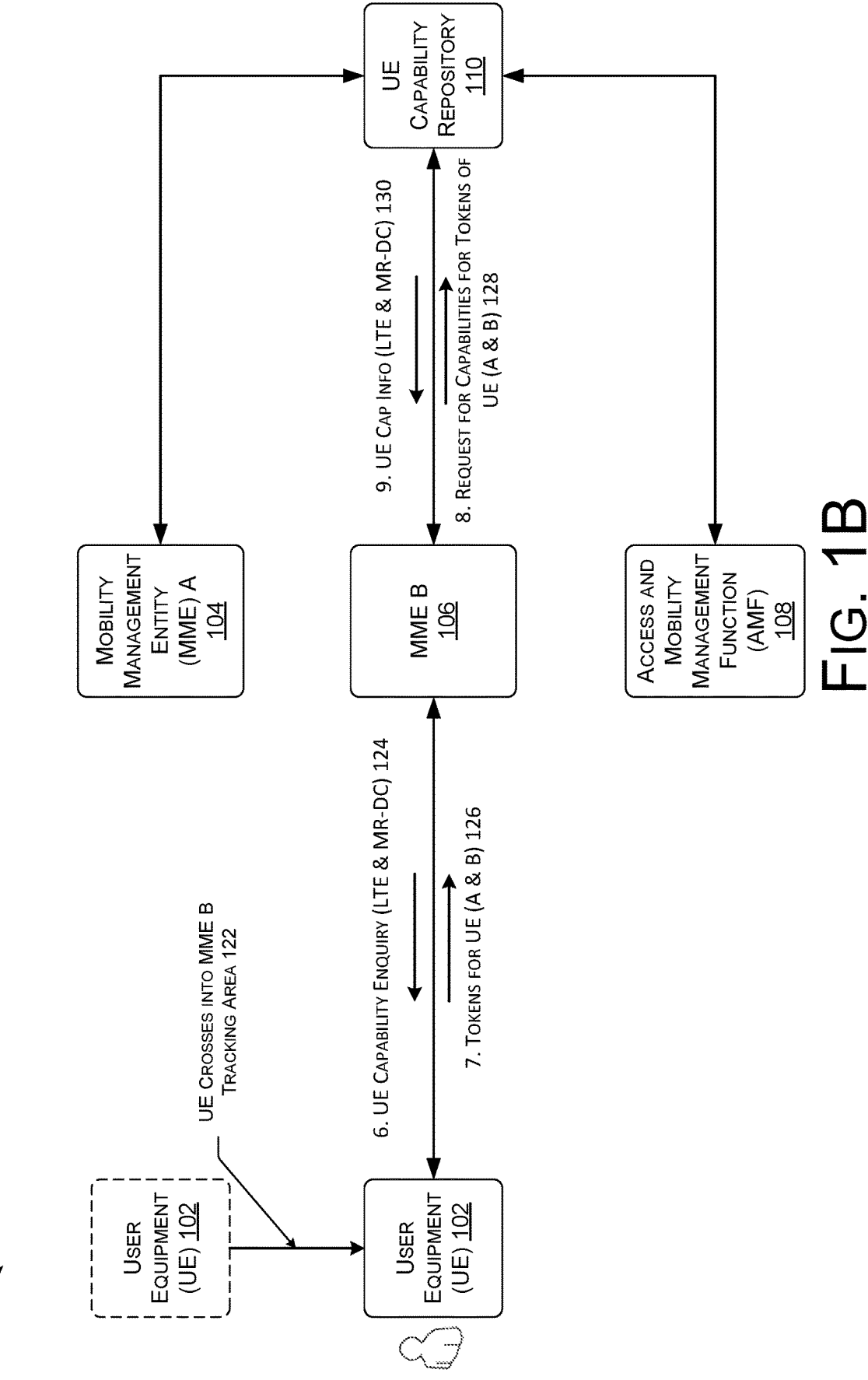

The illustrated operations in FIG. 1B may follow the UE 102 crossing into a tracking area of an eNodeB of MME B 106 at 122.

The MME B 106 may send a UE capability enquiry message 124 to the UE 102 for LTE and MR-DC.

The UE 102 may receive the UE capability enquiry message 124. Because UE 102 has been provided with tokens A and B associated with LTE and MR-DC, respectively, the UE 102 may send a UE capability information message 126 including token A and token B to the MME B 106.

The MME B 106 may receive the UE capability information message 126 from the UE 102. Because the UE capability information message 126 does not include UE capability information, the MME B 106 may send a request 128 for capabilities for the UE 102 including the tokens A and B to the UE capability repository 110.

The UE capability repository 110 may receive the request 128 for capabilities for the UE 102 including the tokens A and B from the MME B 106. The UE capability repository 110 may retrieve the stored UE capability information for LTE associated with token A and the stored UE capability information for MR-DC associated with token B. The UE capability repository 110 may then send message 130 including UE capability information for LTE and MR-DC to the MME B 106.

The MME B 106 may receive the message 130 from the UE capability repository 110. If the MME A 104, the MME B 106, or the AMF 108 include a local store of associations between tokens and UE capability information, the MME B 106, may store associations between the token A and the UE capability information for LTE and between token B and the UE capability information for MR-DC. The MME B 106 may then utilize the UE capability information for LTE and the UE capability information for MR-DC in operations with UE 102.

In some examples, a UE capability enquiry may be triggered by UE 102 changing tracking area. For example, a UE capability enquiry may be triggered if, after sending message 120, the UE 102 changes between eNodeBs but remains in the area controlled by MME A 104. If the MME A 104, the MME B 106, or the AMF 108 do not include a local store of associations between tokens and UE capability information, similar operations to those discussed above for MME B 106 and messages 124-130 may be performed when a UE capability enquiry is triggered for the UE 102 with respect to MME A 104 after the MME A 104 sends message 120 to the UE 102 including token A and token B.

Alternatively, if the MME A 104, the MME B 106, or the AMF 108 include a local store of associations between tokens and UE capability information and a UE capability enquiry is triggered for the UE 102 with respect to MME A 104 after the MME A 104 sends message 120 to the UE 102 including token A and token B, upon receiving a UE capability information message including token A and token B, MME A 104 may retrieve the UE capability information for token A and token B from the local store instead of requesting the information from the UE capability repository 110.

Figure 1C:

The illustrated operations in FIG. 1C may begin when the network initiates a UE capability enquiry for UE capability information for 5G Standalone (SA) (e.g., for which the network does not have UE capability information).

Specifically, the MME B 106 may send a UE capability enquiry message 132 to the UE 102 for SA.

The UE 102 may receive the UE capability enquiry message 132. While UE 102 has tokens A and B for LTE and MR-DC, because UE 102 has not been provided with a token associated with SA, the UE 102 may send a UE capability information message 134 for SA to the MME B 106.

The MME B 104 may receive the UE capability information message 134 from the UE 102. Because the UE capability information message 134 includes UE capability information, the MME B 106 may send a message 136 including the UE capability information for SA to the UE capability repository 110.

The UE capability repository 110 may receive the message 136 including the UE capability information for SA from the MME B 106. The UE capability repository 110 may generate a token C for SA. The UE capability repository 110 may then store association between the token C and the UE capability information for SA. The UE capability repository 110 may then send a message 138 to the MME B 106 including token C.

The MME B 106 may receive the message 138 from the UE capability repository 110. If the MME A 104, the MME B 106, or the AMF 108 include a local store of associations between tokens and UE capability information, the MME B 106 may store an association between the token C and the UE capability information for SA. The MME B 106 may further send a message 140 to the UE 102 including token C.

Figure 1D:

The illustrated operations in FIG. 1D may follow the UE 102 attaching to the AMF 108 and/or transitioning from non-standalone (NSA) to SA at 142.

The AMF 108 may send a UE capability enquiry message 144 to the UE 102 for SA.

The UE 102 may receive the UE capability enquiry message 144. Because UE 102 has been provided with token C associated with SA, the UE 102 may send a UE capability information message 146 including token C to the AMF 108.

The AMF 108 may receive the UE capability information message 146 from the UE 102. Because the UE capability information message 146 does not include UE capability information, the AMF 108 may send a request 148 for capabilities for the UE 102 including the token C to the UE capability repository 110.

The UE capability repository 110 may receive the request 148 for capabilities for the UE 102 including the token C from the AMF 108. The UE capability repository 110 may retrieve the stored UE capability information for SA associated with token C. The UE capability repository 110 may then send a message 150 including the UE capability information for SA to the AMF 108.

The AMF 108 may receive the message 150 from the UE capability repository 110. If the MME A 104, the MME B 106, or the AMF 108 include a local store of associations between tokens and UE capability information, the AMF 108 may store an association between the token C and the UE capability information for SA. The AMF 108 may then utilize the UE capability information for SA in operations with UE 102.

Figure 2:
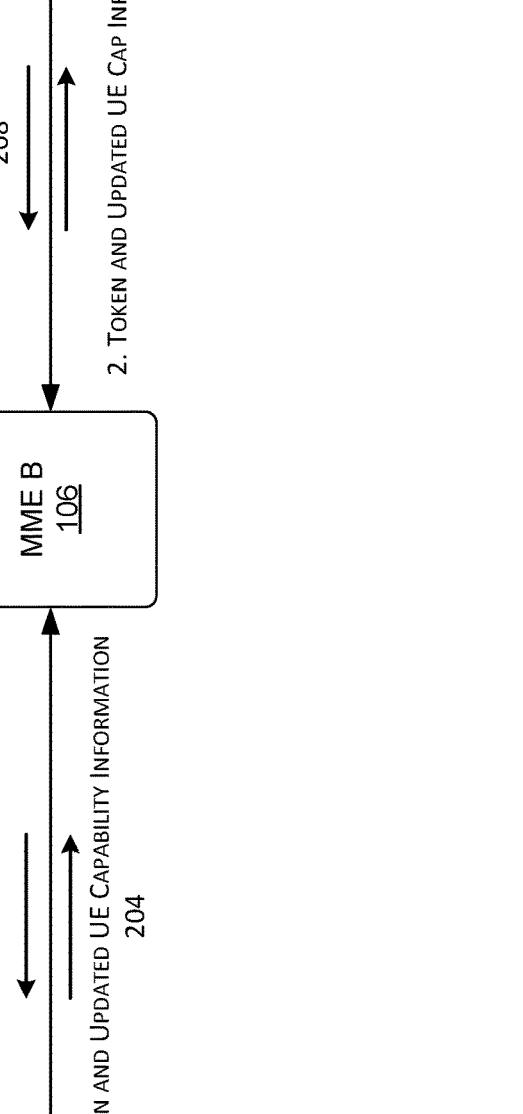
FIG. 2 illustrates additional operations of the example telecommunications system of FIGS. 1A-1D, according to some implementations.

FIG. 2 illustrates additional operations 200 of the example telecommunications system 100 of FIGS. 1A-1D. Specifically, the operations illustrated in FIG. 2 may follow the operations in FIG. 1B or FIG. 1C and a change at 202 in the capabilities of the UE 102 a RAT for which the UE 102 has been provided a token.

Because UE 102 has been provided a token for the RAT with changed capabilities, the UE 102 may send a UE capability information message 204 to the MME B 106 for the RAT with changed capabilities. The UE capability information message 204 may include the updated capabilities for the RAT and the existing token for the RAT.

The MME B 104 may receive the UE capability information message 204 from the UE 102. Because the UE capability information message 204 includes UE capability information, the MME B 106 may send a message 206 including the updated capabilities for the RAT and the existing token for the RAT to the UE capability repository 110.

The UE capability repository 110 may receive the message 206 from the MME B 106. The UE capability repository 110 may remove the stored association for the existing token. The UE capability repository 110 may then generate a new updated token for the RAT. The UE capability repository 110 may then store an association between the new updated token and the updated UE capability information for the RAT. The UE capability repository 110 may then send a message 208 to the MME B 106 including the updated token for the RAT.

The MME B 106 may receive the message 208 from the UE capability repository 110. If the MME A 104, the MME B 106, or the AMF 108 include a local store of associations between tokens and UE capability information, the MME B 106 may replace the association for the existing token with an association between the updated token and the updated UE capability information for the RAT. The MME B 106 may further send a message 210 to the UE 102 including the updated token for the RAT.

While the example shown in FIG. 2 relates to a change in capability information for one RAT, examples are not so limited and the operations of FIG. 2 may be extended to combinations of RATs.

FIG. 3 illustrates an example method 300 for providing UE capability message handling with reduced network traffic using a UE capability repository, according to some implementations. More particularly, FIG. 3 illustrates operations of a MME (e.g., MMEs 104 and 106) that may provide message handling with reduced network traffic using a UE capability repository. However, the operations are not limited to a MME and may be performed by an AMF (e.g., AMF 108) or other network components.

At 302, the MME may receive, from a UE, a UE capability information message for a RAT or a combination of RATs. At 304, the MME may determine whether the UE capability information message includes full UE capability information for a RAT. If not, the process may continue to 306. Otherwise, the process may continue to 308.

At 306 (e.g., via no at 304), the MME may determine whether the UE capability information message includes a token for which the MME has locally stored (e.g., cached) an association with UE capability information for a RAT for the UE. If so, the process may continue to 310. Otherwise, the process may continue to 312.

At 310, the MME may utilize the locally stored UE capability information associated with the token for communicating with the UE. For example, a base station associated with MME may be configured to perform suitable scheduling and transmission/reception management for the UE, based on the locally stored UE capability information associated with the token.

Returning to 312 (e.g., via no at 306), the MME may request UE capability information associated with the token from the UE capability repository. At 314, the MME may receive, from the UE capability repository, UE capability information associated with the token. At 316, the MME may utilize the received UE capability information associated with the token for communicating with the UE. For example, a base station associated with MME may be configured to perform suitable scheduling and transmission/reception management for the UE, based on the UE capability information received from the UE capability repository.

Returning to 308 (e.g., via yes at 304), the MME may locally store the UE capability information received from the UE for communicating with the UE. If previous UE capability information for the same UE and RAT is already locally stored in association with a prior token, the MME may remove the existing association from local storage. The MME may also utilize the UE capability information received from the UE for communicating with the UE. For example, a base station associated with MME may be configured to perform suitable scheduling and transmission/reception management for the UE, based on the UE capability information received from the UE.

At 318, the MME may forward the full UE capabilities to the UE capability repository. At 320, the MME may receive a token associated with the full UE capabilities from the UE capability repository. The MME may store an association of the token to the UE capability information received from the UE. At 322, the MME may forward the token received from the UE capability repository to the UE.

Additional details of the operations shown in FIG. 3 are provided above with regard to FIGS. 1A-1D and 2 and are not repeated here to avoid unnecessary verbosity.

FIG. 4 illustrates a component level view of a telecommunication network device 400 capable of implementing the UE 102, MMEs 104 and 106, AMF 108, and/or UE capability repository 110 of FIGS. 1A-1D and 2. The network device 400 may, as an example, comprise a physical or virtual device. The network device 400 may comprise a system memory 402 storing various executable components and data for implementing the systems and methods 100-300 of FIGS. 1A-2. The network device 400 may further comprise processor(s) 404, a removable storage 406, a non-removable storage 408, transceivers 410, output device(s) 412, and input device(s) 414, any or all of which can be communicatively connected via a communications bus (not shown).

In various examples, the system memory 402 is volatile (such as RAM), non-volatile (such as ROM, flash memory, etc.) or some combination of the two. In some examples, the processor(s) 404 is a central processing unit (CPU), a graphics processing unit (GPU), or both CPU and GPU, or any other sort of processing unit.

The network device 400 also includes additional data storage devices (removable and/or non-removable) such as, for example, magnetic disks, optical disks, or tape. Such additional storage is illustrated in FIG. 4 by removable storage 406 and non-removable storage 408. The system memory 402, removable storage 406 and non-removable storage 408 are all examples of non-transitory computer-readable storage media.

In some examples, the transceivers 410 include any sort of transceivers known in the art. For example, transceivers 410 may include a radio transceiver that performs the function of transmitting and receiving radio frequency communications. Also, or instead, the transceivers 410 may include other wireless or wired connectors, such as Ethernet connectors or near-field antennas. The transceivers 410 may facilitate connectivity between a public network, such as a packet-switched access network (not shown), and one or more other devices of a telecommunication network.

In some examples, the output devices 412 include any sort of output devices known in the art, such as a display, speakers, a vibrating mechanism, or a tactile feedback mechanism. Output devices 412 also include ports for one or more peripheral devices, such as headphones, peripheral speakers, or a peripheral display.

In various examples, the input devices 414 include any sort of input devices known in the art. For example, the input devices 414 may include a camera, a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although features and/or methodological acts are described above, it is to be understood that the appended claims are not necessarily limited to those features or acts. Rather, the features and acts described above are disclosed as example forms of implementing the claims.

What is claimed is:

1. A method comprising:

receiving, by a network component of a carrier network and from a user equipment (UE), a token associated with UE capability information of the UE;

transmitting, by the network component and to a UE capability repository, a request for UE capability information of the UE based at least in part on the token;

receiving, by the network component and from the UE capability repository, the UE capability information of the UE associated with the token; and performing, by the carrier network, operations with the UE based on the UE capability information of the UE associated with the token.

2. The method of claim 1, further comprising:

receiving, by the network component of the carrier network and from another UE, UE capability information of the other UE;

transmitting, by the network component and to the UE capability repository, the UE capability information of the other UE;

receiving, by the network component from the UE capability repository, another token associated with the UE capability information of the other UE; and transmitting, by the network component and to the other UE, the other token.

3. The method of claim 1, wherein the token corresponds to a radio access technology (RAT) or a combination of RATs.

4. The method of claim 1, wherein the network component is one of a Mobility Management Entity (MME) or Access and Mobility Management Function (AMF).

5. The method of claim 1, further comprising:

receiving, by the network component of the carrier network and from the UE, updated UE capability information of the UE and the token associated with the UE capability information of the UE;

transmitting, by the network component and to the UE capability repository, the updated UE capability information of the UE and the token;

receiving, by the network component from the UE capability repository, an updated token associated with the updated UE capability information of the UE; and transmitting, by the network component and to the other UE, the updated token.

6. The method of claim 1, wherein the token and the UE capability information of the UE correspond to at least one radio access technology (RAT), the method further comprising:

receiving, by the network component of the carrier network and from the UE, additional UE capability information of the UE, the additional UE capability information of the UE corresponding to another RAT different from the at least one RAT;

transmitting, by the network component and to the UE capability repository, the additional UE capability information of the UE;

receiving, by the network component from the UE capability repository, another token associated with the additional UE capability information of the UE; and transmitting, by the network component and to the UE, the other token.

7. The method of claim 1, further comprising:

transmitting, by the network component and to the UE, a UE capability enquiry for at least one radio access technology (RAT), wherein:

the token associated with UE capability information of the UE is received from the UE in a response to the UE capability enquiry.

8. A system comprising:

one or more computing devices of a carrier network configured to perform operations comprising:

receiving, by a network component of the carrier network and from a user equipment (UE), a token associated with UE capability information of the UE;

transmitting, by the network component and to a UE capability repository, a request for UE capability information of the UE based at least in part on the token;

receiving, by the network component and from the UE capability repository, the UE capability information of the UE associated with the token; and performing, by the carrier network, operations with the UE based on the UE capability information of the UE associated with the token.

9. The system of claim 8, the operations further comprising:

receiving, by the network component of the carrier network and from another UE, UE capability information of the other UE;

transmitting, by the network component and to the UE capability repository, the UE capability information of the other UE;

receiving, by the network component from the UE capability repository, another token associated with the UE capability information of the other UE; and transmitting, by the network component and to the other UE, the other token.

10. The system of claim 8, wherein the token corresponds to a radio access technology (RAT) or a combination of RATs.

11. The system of claim 8, wherein the network component is one of a Mobility Management Entity (MME) or Access and Mobility Management Function (AMF).

12. The system of claim 9, the operations further comprising:

receiving, by the network component of the carrier network and from the UE, updated UE capability information of the UE and the token associated with the UE capability information of the UE;

transmitting, by the network component and to the UE capability repository, the updated UE capability information of the UE and the token;

receiving, by the network component from the UE capability repository, an updated token associated with the updated UE capability information of the UE; and transmitting, by the network component and to the other UE, the updated token.

13. The system of claim 8, wherein the token and the UE capability information of the UE correspond to at least one radio access technology (RAT), the operations further comprising:

receiving, by the network component of the carrier network and from the UE, additional UE capability information of the UE, the additional UE capability information of the UE corresponding to another RAT different from the at least one RAT;

transmitting, by the network component and to the UE capability repository, the additional UE capability information of the UE;

receiving, by the network component from the UE capability repository, another token associated with the additional UE capability information of the UE; and transmitting, by the network component and to the UE, the other token.

14. The system of claim 8, the operations further comprising:

transmitting, by the network component and to the UE, a UE capability enquiry for at least one radio access technology (RAT), wherein:

the token associated with UE capability information of the UE is received from the UE in a response to the UE capability enquiry.

15. A non-transitory computer-readable media storing computer-executable instructions, which when executed by one or more processors, cause the one or more processors to perform operations comprising:

receiving, by a network component of a carrier network and from a user equipment (UE), a token associated with UE capability information of the UE;

transmitting, by the network component and to a UE capability repository, a request for UE capability information of the UE based at least in part on the token;

receiving, by the network component and from the UE capability repository, the UE capability information of the UE associated with the token; and performing, by the carrier network, operations with the UE based on the UE capability information of the UE associated with the token.

16. The non-transitory computer-readable media of claim 15, the operations further comprising:

receiving, by the network component of the carrier network and from another UE, UE capability information of the other UE;

transmitting, by the network component and to the UE capability repository, the UE capability information of the other UE;

receiving, by the network component from the UE capability repository, another token associated with the UE capability information of the other UE; and transmitting, by the network component and to the other UE, the other token.

17. The non-transitory computer-readable media of claim 16, wherein the token corresponds to a radio access technology (RAT) or a combination of RATs.

18. The non-transitory computer-readable media of claim 15, wherein the network component is one of a Mobility Management Entity (MME) or Access and Mobility Management Function (AMF).

19. The non-transitory computer-readable media of claim 15, the operations further comprising:

receiving, by the network component of the carrier network and from the UE, updated UE capability information of the UE and the token associated with the UE capability information of the UE;

transmitting, by the network component and to the UE capability repository, the updated UE capability information of the UE and the token;

receiving, by the network component from the UE capability repository, an updated token associated with the updated UE capability information of the UE; and transmitting, by the network component and to the other UE, the updated token.

20. The non-transitory computer-readable media of claim 15, wherein the token and the UE capability information of the UE correspond to at least one radio access technology (RAT), the operations further comprising:

receiving, by the network component of the carrier network and from the UE, additional UE capability information of the UE, the additional UE capability information of the UE corresponding to another RAT different from the at least one RAT;

transmitting, by the network component and to the UE capability repository, the additional UE capability information of the UE;

receiving, by the network component from the UE capability repository, another token associated with the additional UE capability information of the UE; and transmitting, by the network component and to the UE, the other token.

*    *    *    *    *